United States Patent [19]

Robbins, III

[11] Patent Number: 5,292,242
[45] Date of Patent: Mar. 8, 1994

[54] APPARATUS FOR FORMING A COLLAPSIBLE CONTAINER

[76] Inventor: Edward S. Robbins, III, 459 North Ct., Florence, Ala. 35631

[21] Appl. No.: 11,624
[22] Filed: Feb. 1, 1993

Related U.S. Application Data

[62] Division of Ser. No. 828,473, Jan. 30, 1992, Pat. No. 5,206,037, which is a division of Ser. No. 576,080, Aug. 31, 1990, Pat. No. 5,224,613.

[51] Int. Cl.$^5$ .............................................. B29C 53/02
[52] U.S. Cl. ................................ 425/342.1; 425/343; 425/387.1; 425/397; 425/522
[58] Field of Search ............ 425/522, 525, 340, 342.1, 425/343, 387.1, 388, 392, 393, 394, 397, 398, DIG. 14; 264/339, 531, 534, 295, 296, DIG. 41; 215/1 C, 10, 12.1, 11.6; 220/8, 403, 410, 462, 470, 666, 675, 608, 95, 105, 107

[56] References Cited

U.S. PATENT DOCUMENTS

| | | | |
|---|---|---|---|
| 3,597,793 | 8/1971 | Weiler et al. | 425/525 X |
| 3,819,789 | 6/1974 | Parker | 425/398 X |
| 4,017,250 | 4/1977 | Chang et al. | 425/525 X |
| 4,035,461 | 7/1977 | Korth | 264/295 X |
| 4,079,111 | 3/1978 | Uhlig | 264/296 X |
| 4,120,927 | 10/1978 | Nielsen | 425/525 X |
| 4,228,121 | 10/1980 | Meadors | 425/398 X |
| 4,648,934 | 3/1987 | Kiss | 425/398 X |
| 4,867,313 | 9/1989 | Padovani | 215/10 X |
| 5,020,691 | 6/1991 | Nye | 264/534 X |
| 5,206,037 | 4/1993 | Robbins, III | 425/397 |
| 5,224,613 | 7/1993 | Robbins, III | 215/10 |

FOREIGN PATENT DOCUMENTS

59-73926  4/1984  Japan ................... 264/531

Primary Examiner—Richard L. Chiesa
Attorney, Agent, or Firm—Nixon & Vanderhye

[57] ABSTRACT

An apparatus for collapsing and folding an upright container to a compact stackable configuration, the container having a bottom wall, peripheral side wall with at least upper, lower and intermediate annular stepped portions in the peripheral side wall, and a top wall having a discharge opening therein, includes tooling for supporting and holding the container in an upright position; a first forming element for engaging and exerting a downward force on the intermediate annular stepped portion of the peripheral side wall and for effecting the formation of a first folded portion in the peripheral side wall; and a second forming element for engaging and exerting a downward force on the top wall for effecting the formation of a second folded portion in the peripheral side wall, substantially concentric with and radially adjacent the first folded portion.

11 Claims, 14 Drawing Sheets

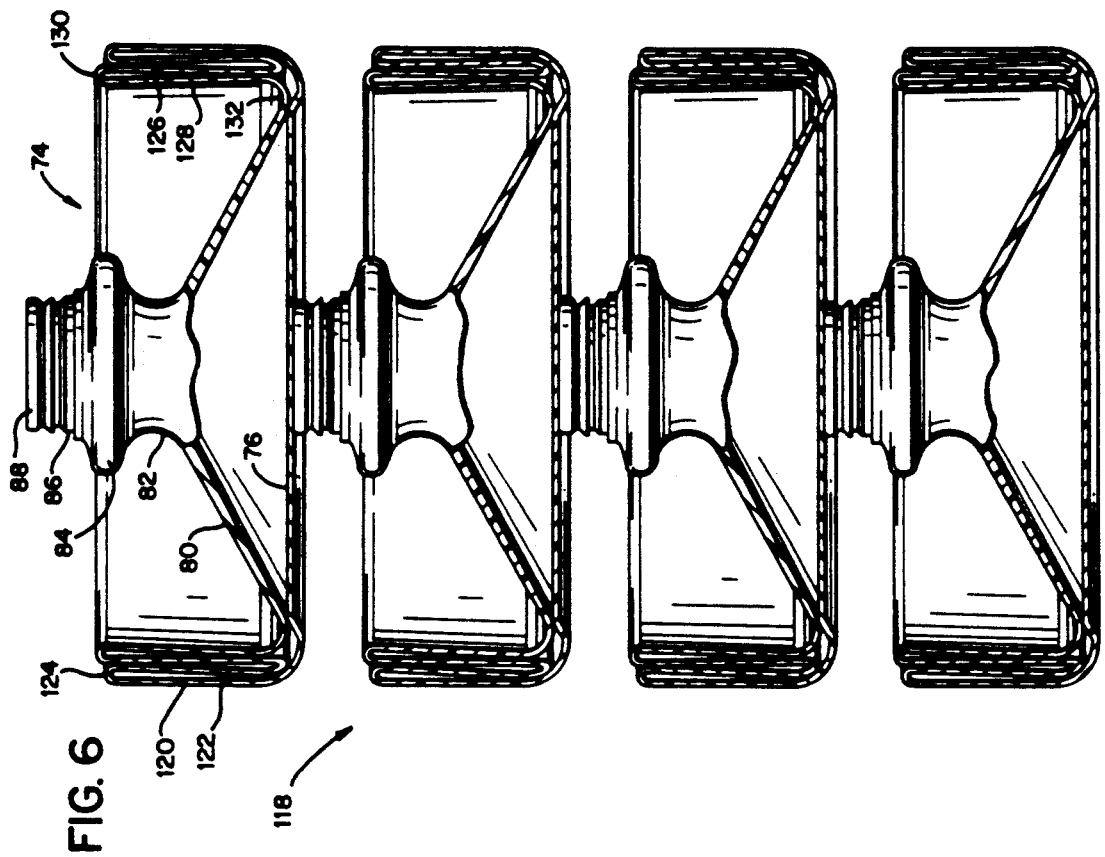
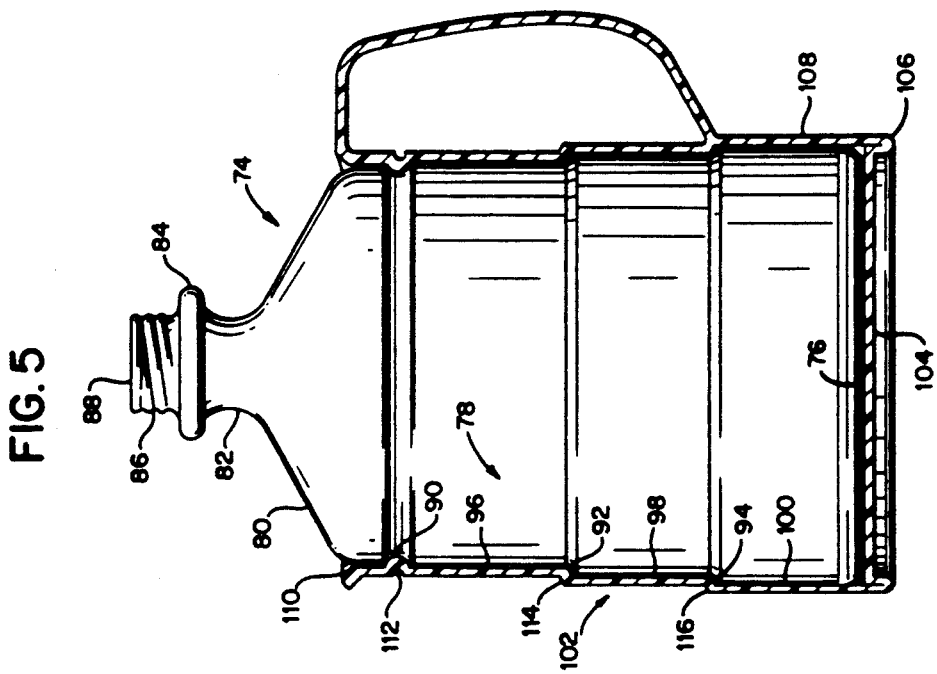

APPARATUS FOR FORMING A COLLAPSIBLE CONTAINER

This is a division of application Ser. No. 07/828,473, filed Jan. 30, 1992, now U.S. Pat. No. 5,206,037, which is a division of Ser. No. 07/576,080, filed Aug. 31, 1990, now U.S. Pat. No. 5,224,613.

BACKGROUND AND SUMMARY OF THE INVENTION

This invention relates generally to plastic bottle or container constructions, and particularly to thin walled bottles or containers which are collapsible and foldable, as well as to a process and apparatus for collapsing such bottles or containers.

In the container industry, there are a number of known applications for relatively thin, flexible bottles or containers, some of the more well known of which relate to the shipment and retail sale of beverages such as milk, water, juice, etc., as well as liquid or powdered cleaners, detergents and the like.

It is often the case that such containers must be shipped over considerable distances to distributors who fill and then ship the filled containers to retail concerns. During the initial shipment to distributors, the empty containers, for example one gallon containers, take up so much space that, from a volume standpoint, the manufacturer is shipping mostly air.

At the same time, there is great concern in the environmental arena for plastic materials which for the most part are not biodegradable, and which therefore pose significant disposal problems, particularly in light of the ever expanding utilization of plastics in virtually every area of technology. The problem is especially acute in the container industry.

This invention seeks to alleviate both of the above described concerns by:

1) providing a plastic bottle or container construction which requires approximately one half of the plastic currently used in most plastic containers, particularly those which typically carry milk, water, juice, detergents (liquid or powder) and other liquids and/or particulates; and 2) shaping the containers in such a way as to facilitate collapse and folding to a compact size which results in a four or more to one increase in shipping capacity.

For purposes of this invention, the term "container" refers to plastic containers or bottles having shapes as disclosed herein. In accordance with a preferred embodiment of the invention, a thin walled plastic container is manufactured by an extrusion or injection blow molding process, incorporating a thin walled construction which permits the normally self-supporting container to be collapsed and a portion or portions concentrically folded to provide a compact, nestable and/or stackable container for efficient shipment.

The container side wall in a preferred embodiment is provided with peripheral, vertically spaced steps or shoulders which facilitate axial collapse and subsequent concentric folding of portions of the side wall to provide a collapsed and folded container article with at least four "layers" of side wall arranged in a zig-zag or S-shaped configuration, in generally surrounding relationship to tapered shoulder and narrow neck portions of the container.

The container side wall may also be formed originally with one or more steps, or with a smooth, tapered or even straight peripheral side wall and nevertheless collapsed and folded as will be explained further herein.

A plurality of containers collapsed and folded in the manner described above may be arranged in the form of a stack for easy and efficient shipment.

There is also disclosed for eventual use with the preferred embodiment of the invention a relatively rigid open-topped pitcher for receiving and holding the plastic container. The pitcher is formed with interior beads and/or steps about its periphery, which are designed to engage the corresponding steps or shoulders on the container side wall to thereby hold the container in place during pouring.

An exemplary embodiment of an apparatus utilized to carry out the collapsing and folding operation includes a container holder and reciprocable fluid actuated tool members which act in sequence to form first and second folded portions of the container. More specifically, one exemplary embodiment of the apparatus includes a container holder device, opposing elements of which are reciprocable between open and closed positions, and adapted to hold or support a container during a collapsing and folding operation. The holder is mounted on a supporting surface provided with an opening through which an associated container may be brought into position. The supporting surface is also provided with one or more stops for limiting downward movement of a container-engaging tool element as described in greater detail below.

The apparatus also includes a tool frame comprising a stationary platen supported on a plurality of columns in vertical alignment with the container holder device. The stationary platen mounts a main double acting cylinder assembly. A lower piston rod portion (which is of tubular construction) extends through the stationary platen and is secured to an inner container-engaging pusher member. An outer container engaging pusher member or sleeve is concentrically located relative to the inner pusher member and is held in resilient spaced relationship thereto by guide bars and a pair of side cylinder assemblies, the cylinders of which are secured to the inner pusher member and the piston rods of which are secured to the outer pusher member.

The inner pusher member includes a movable upper platen provided with a substantially cylindrical lower portion having a tapered annular surface which is adapted to engage the tapered shoulder portion of the container.

The outer pusher member or sleeve includes a movable lower platen provided with an annular skirt portion movable in telescoping relationship with the cylindrical lower portion of the inner pusher member. The lower edge of the depending skirt portion is adapted to engage the container sidewall as further described herein.

The lower movable platen is adapted to engage the one or more stops provided on the supporting surface to limit downward movement of the outer pusher member, while the lower movable platen itself serves as a stop to limit the relative downward movement of the inner pusher member and its associated upper movable platen.

An upper tubular piston rod portion of the main double acting cylinder is fixedly secured at its distal end to a lower horizontal element of an open rectangular frame. A top cylinder assembly is fixedly secured to an upper horizontal element of the open rectangular frame, with the piston of the top cylinder extending through the upper frame element and connected to an upper side of a pancake cylinder assembly, so that the pancake cylinder assembly is reciprocable within the open rectangular frame, independent of the main cylinder. The lower side of the pancake cylinder assembly mounts an air adaptor manifold (including an air inlet and an outlet) which in turn is connected to an air tube which extends downwardly through the tubular main piston and through the stationary, upper and lower platens to a recessed area within the center of the inner pusher member. At the same time, the pancake cylinder has a small diameter rod attached to (or integral with) its own piston rod which extends downwardly through and below the lower end of the air tube.

The lower end of the tube is fixed to an upper washer or bushing and the lower end of the rod is fixed to a lower washer or bushing. Between the two washers or bushings, there is located a resilient, expandable plug, shaped and sized to fit within the discharge opening of a container. The lower bushing also is provided with apertures for introducing air from the air tube to the interior of the container, and for exhausting air from the container during the collapsing and folding operation.

The operation of the above described apparatus is explained briefly below, and in more detail further herein.

Initially, a series of containers may be fed, one at a time, on a conveyor or the like structure to a location beneath an aperture provided within the supporting surface of a work table. At this location, lateral movement of the containers may be halted and the main cylinder assembly actuated to move the inner and outer pusher members to their downwardmost position, along with the open rectangular frame and associated pancake cylinder and top cylinder. Once the components are in their fully lowered position, the top cylinder is actuated to extend the pancake cylinder and tube and rod members to a loading position where the resilient plug is located below the work table. In a fully automated system, the downward movement of the plug would terminate with the plug located in the discharge opening of the container. In a semi-automatic system, the container may be loaded manually onto the plug. The pancake cylinder itself is then actuated to retract the rod, thereby pulling the lower bushing upwardly relative to the upper bushing to thereby force the resilient plug to expand radially outwardly to simultaneously grip the container and seal the discharge opening thereof. Thereafter, the top cylinder is retracted to draw the container upwardly into the aperture provided in the work table, and the main cylinder is then actuated to draw the inner and outer pusher members, along with the plug and attached container, upwardly so that all components are in their upwardmost position and the container is situated immediately above the supporting surface.

The container holder device is then closed to provide support for the container and to hold the latter in precise alignment during the collapsing and folding operation. In this position, the lower edge of the outer pusher member is located closely adjacent or in engagement with, an intermediate one of the three annular steps on the container side wall.

Air at very low pressure is then introduced into the interior of the container through the tube extending from the resilient plug to the air manifold at the pancake cylinder assembly. This insures that the container will be in a normal fully blown condition with no creases or wrinkles which might otherwise interfere with the collapsing/folding operation.

The air manifold is then opened to permit the controlled escape of air from the container as the deforming operation commences. At this time, the main cylinder is actuated to move the inner and outer pusher members downwardly while the pair of side cylinders maintain a predetermined distance between the upper and lower movable platens of the inner and outer pusher members, respectively. In other words, the side cylinders act as springs, biasing the inner and outer pushers apart. In a preferred embodiment, the outer pusher member engages and pushes downwardly on the intermediate step on the peripheral wall of the container and initiates a first fold which is completed when the lower movable platen abuts the limit stops provided on the supporting surface of the work table. Continued downward movement of the lower piston portion of the main cylinder overcomes the side cylinder forces tending to keep the upper and lower platens apart, so that the inner pusher member engages the shoulder portion of the container, pushing it downwardly to initiate a second folded portion in the peripheral side wall of the container, radially inward and adjacent the first folded portion. This second folded portion is completed when the upper movable platen abuts the lower movable platen.

If desired, the collapsing/folding operation may be terminated at this stage and, upon opening (or retraction) of the container holder and extension of the top cylinder piston, the container is pushed downwardly away from the inner and outer pusher members, and the pancake cylinder may again be actuated to extend the rod and lower bushing downwardly, thereby causing the resilient plug to contract, enabling the completed container to be removed from the apparatus.

In an alternative arrangement, upon completion of the first and second folds by the inner and outer pusher members, and prior to the extension of the pancake cylinder piston, the top cylinder may be actuated to partially extend its piston to thereby push the resilient plug downwardly, thereby also pushing the discharge portion of the container downwardly within the confines of the first and second folds so that the discharge opening does not extend above the uppermost edge of the folded portions. Following opening of the container holder, further extension of the top cylinder and extension of the pancake cylinder rod-.would then enable removal of the container in the manner described above.

Thus, in one aspect, the present invention relates to a collapsed thin wall container for facilitating compact shipment of a plurality of such containers comprising a bottom wall, a peripheral side wall extending from said bottom wall, a tapered shoulder section extending from the peripheral side wall, and a reduced diameter neck portion including a discharge opening extending from the tapered shoulder section, and the peripheral side wall including at least one portion folded outwardly and upwardly to form a first concentric folded portion extending upwardly at least to the tapered shoulder section.

In another aspect, the present invention relates to a stack of containers of the type described above.

In a related aspect, the present invention relates to a thin walled normally self-supporting flexible container of unitary construction having a bottom wall, a peripheral side wall, and a top wall which may include a tapered shoulder section and a reduced diameter neck portion provided with a discharge opening, the improvement comprising a plurality of vertically spaced annular steps formed in the side wall, each step causing the peripheral side wall portion immediately above the step to have a smaller diameter than the peripheral side wall portion immediately below the step, the steps adapted to permit the container to be collapsed and folded to a compact configuration wherein a pair of concentric folded peripheral side wall portions lie radially adjacent each other and adjacent the tapered shoulder and reduced neck portions of the container.

In another aspect, the present invention relates to an apparatus for collapsing and folding an upright container comprising, broadly, means for supporting and holding the container in an upright position; first forming means for engaging and exerting a downward force on the intermediate annular stepped portion for effecting the formation of a first folded portion; and second forming means..for engaging and exerting a downward force on the tapered shoulder portion for effecting the formation of a second folded portion.

Finally, the present invention relates to a method of forming a collapsed and folded container broadly comprising the steps of:

a) providing a normally self-supporting, flexible container of unitary construction and having a bottom wall, a peripheral side wall extending from the bottom wall and a top wall which may include a tapered shoulder section extending from the peripheral side wall, and a reduced diameter neck portion extending from the tapered shoulder portion and including a discharge opening;

b) forming a first folded portion by pushing a first portion of the peripheral side wall downwardly toward the bottom wall; and c) forming a second folded portion by pushing the tapered shoulder section downwardly toward the bottom wall after the completion of step b).

It will be understood that the container itself may have a different shape than that described above. For example, the container top wall may be flat, with a smaller or larger discharge opening therein. In this case, the described method and apparatus would be modified accordingly.

From the above, it will be appreciated that the present invention provides significant benefits in terms of shipping and storage capacity and efficiency while, at the same time, provides for substantial savings in the amount of plastic used in the manufacture of plastic containers, the latter having a further beneficial effect in the matter of waste disposal.

Other objects and advantages of the invention will become apparent from the detailed description which follows.

BRIEF DESCRIPTION OF THE DRAWINGS

FIG. 5 is a partial cross sectional side view of a container in accordance with a third and preferred embodiment of the invention, supported within a relatively rigid outer pitcher;

FIG. 6 is a partial cross sectional side view of a stack of containers of the type illustrated in FIG. 5, collapsed and folded in accordance with the invention;

DETAILED DESCRIPTION OF THE DRAWINGS

Figure 2:
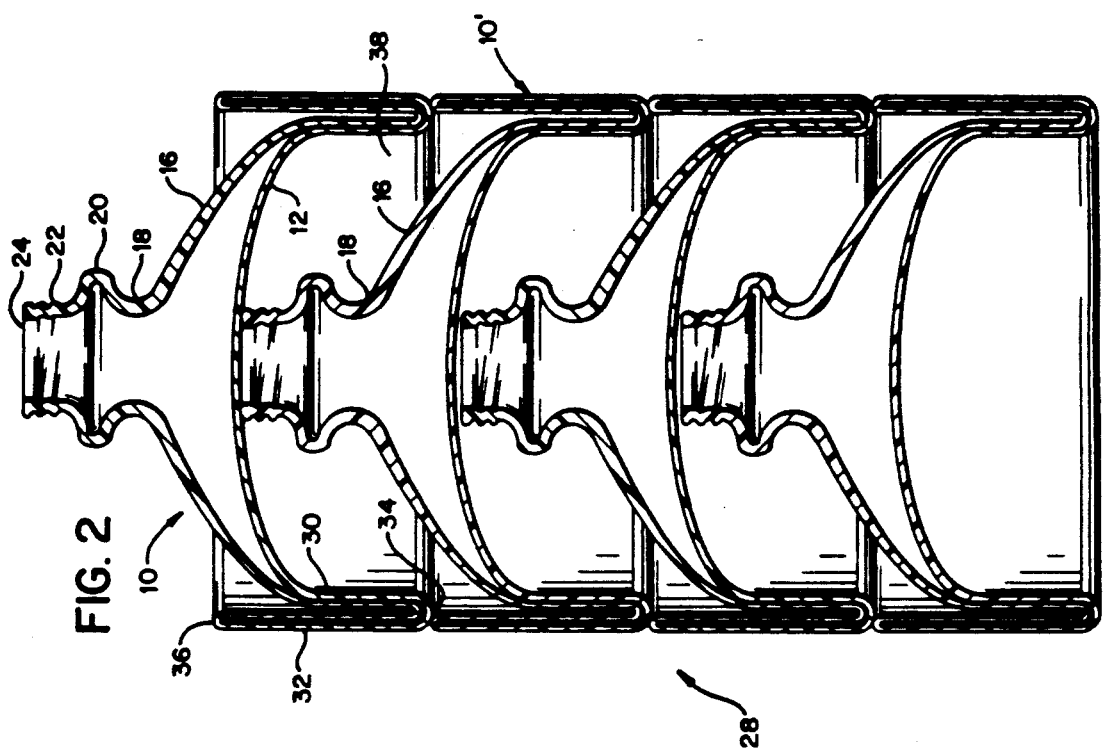
FIG. 2 is a cross sectional side view of a stack of containers of the type illustrated in FIG. 1 but collapsed and folded in accordance with the invention.
Figure 1:
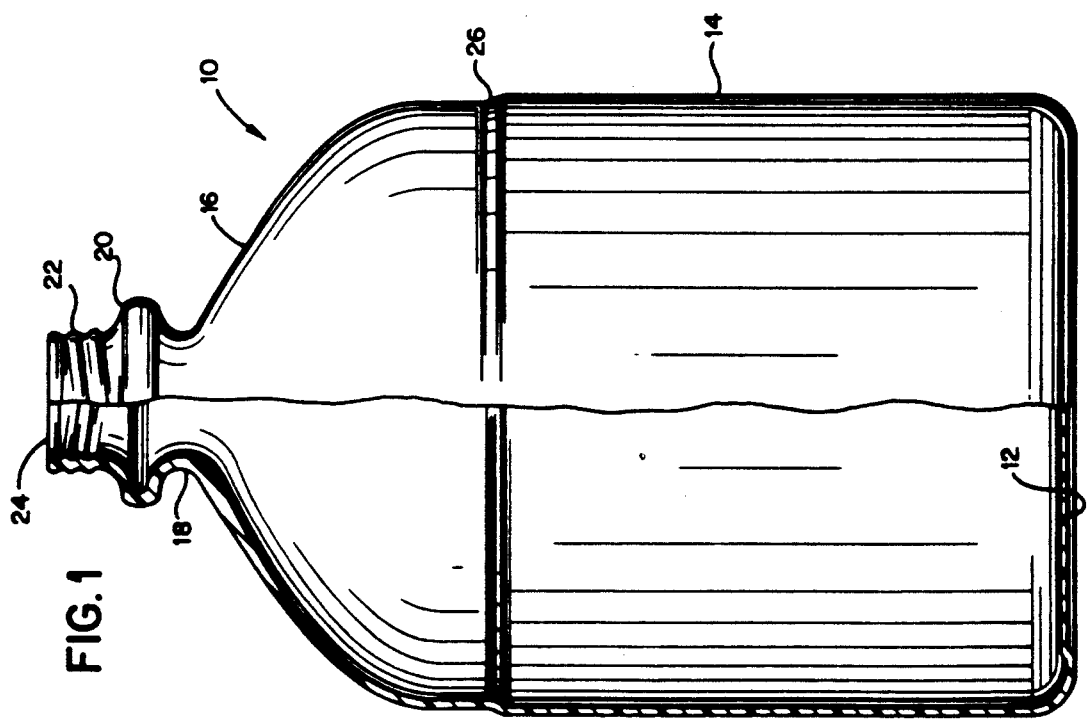
FIG. 1 is a partial cross sectional side view of an upright container in accordance with an exemplary embodiment of the invention.

With reference to FIGS. 1 and 2, a thin walled, one gallon plastic container 10 in accordance with an exemplary embodiment of the invention includes a bottom wall 12, a peripheral side wall 14, and a top wall which may comprise a tapered shoulder portion 16, and a narrow neck portion 18. The neck portion 18 may be provided with a radially outwardly directed flange 20 and a series of threads 22 at the uppermost end of the neck portion surrounding a discharge opening 24. The threads 22 are designed to receive a conventional screw type closure (not shown).

In a preferred embodiment, the bottle or container is a unitary structure formed by extrusion or injection blow molding or other conventional plastic forming process. The finished side wall 14 has a preferred thickness between 0.004 and 0.010 of an inch, and the neck portion 18 has a preferred thickness between about 0.010 and 0.030 of an inch. The bottom wall 12 has a thickness substantially the same as the side wall 14, i.e., between 0.010 and 0.025 of an inch, but it may be slightly thicker as a result of the pinching off of the parison prior to blowing. Other thickness ranges are possible for the various container portions, the significant criteria being that the bottle be normally self-supporting but easily collapsed and folded in the manner described below.

One gallon containers formed with the above dimensions represent an approximate 50% reduction in the amount of plastic material required, as compared to conventional milk containers. Similar savings can be expected with containers of other sizes as well.

Suitable semi-rigid (or more flexible) plastics including high density polyethylene (HDPE) and PET may be used for the liner, but linear low density polyethylene (LLDPE) is presently preferred.

In one exemplary embodiment, the peripheral side wall of the bottle or container is provided with an annular step or shoulder 26 to facilitate the collapsing and folding operation.

With reference now to FIG. 2, a stack 28 of thin walled bottles 10 is illustrated, with each container 10 collapsed to a stackable and nestable configuration. As shown in FIG. 2, each container includes an inwardly domed portion 30 and an outwardly and upwardly folded concentric portion 32 extending to an uppermost tip 36 which lies within the plane of the tapered shoulder portion 16 of the container 10. The inwardly and upwardly domed portion 30 extends into the tapered shoulder section 16 so that a recess 38 is formed in the lower portion of the container for receiving the neck portion 18 and part of the tapered shoulder portion 16 of adjacent container 10'. A series of such collapsed and folded containers may be stacked and nested as shown in FIG. 2 so as to conserve significant space during shipping and/or storage prior to filling.

Figure 3:
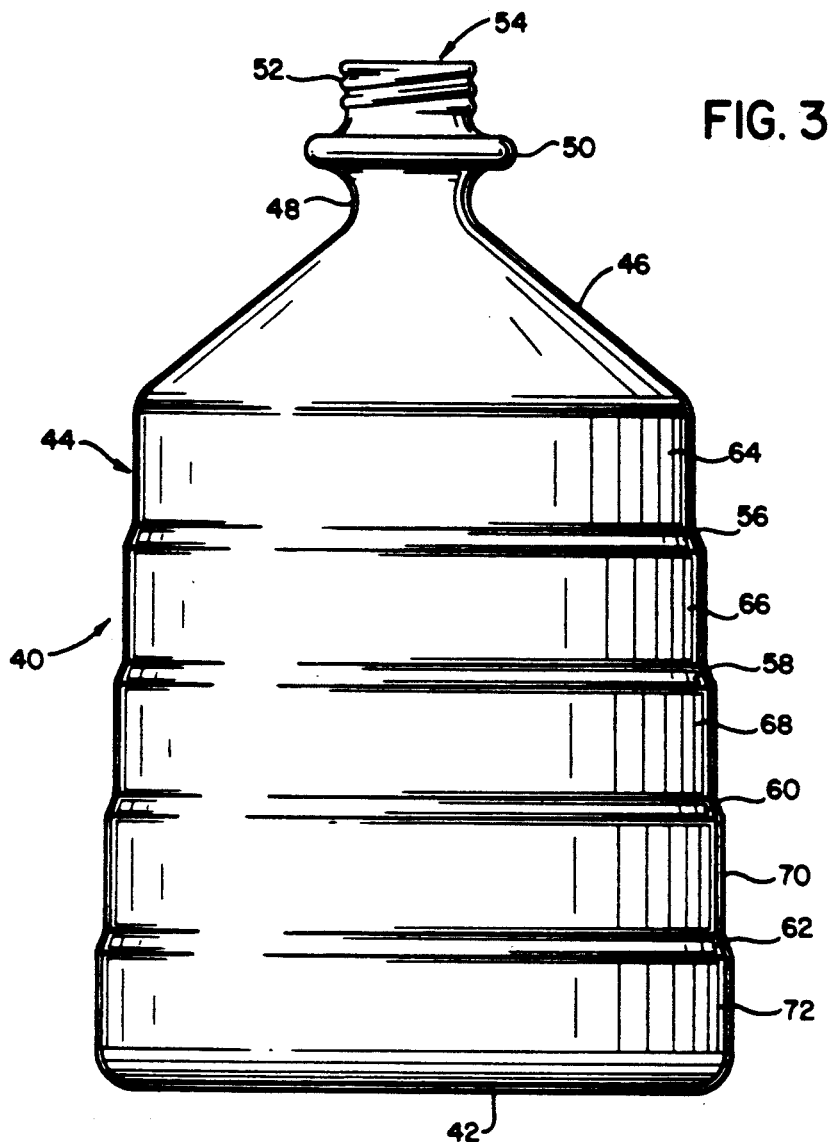
FIG. 3 is a side view of a container in accordance with a second exemplary embodiment of the invention.

With reference now to FIG. 3, another plastic container configuration in accordance with a second exemplary embodiment of the invention is illustrated. This second container 40 includes a bottom wall 42, a peripheral side wall 44, a tapered shoulder area 46 leading to a reduced diameter neck portion 48. Within this reduced diameter neck portion is provided a radially enlarged flange 50 and an uppermost portion including a threaded closure receiving portion 52 surrounding a discharge opening 54. As in the previously described embodiment, a conventional screw type or snap-on closure (not shown) may be utilized in conjunction with the container 40.

This second exemplary embodiment of the invention is generally similar to the first described embodiment with the principal distinction relating to the formation of a plurality of annular steps or shoulders 56, 58, 60 and 62 in vertically spaced relationship along the peripheral side wall 44 of the container. These steps or shoulders serve to enlarge the diameter of the container in each adjacent lower portion, so that different diameter side wall portions 64, 66, 68, 70 and 72 are created by the series of steps or shoulders, to create an overall slightly tapered appearance.

Figure 4:
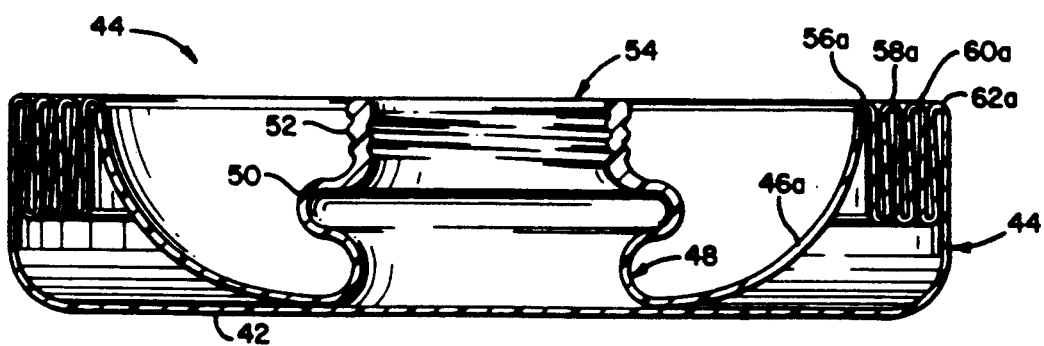
FIG. 4 is a side cross sectional view of a container of the type illustrated in FIG. 3, collapsed and folded in accordance with the invention.

The bottle as shown in FIG. 3 may be collapsed to the configuration shown in FIG. 4, with each of the steps 56, 58, 60 and 62, facilitating the formation of adjacent and concentric folded portions 56a, 58a, 60a and 62a, respectively. If desired, the shoulder section 46 may also be essentially inverted to the upward and outward configuration shown at 46a. By this arrangement, the neck portion 48 lies substantially flush with, or slightly below the uppermost edges of the folded portions 56a, 58a, etc., to provide an even more compact stacking arrangement.

Turning to FIG. 5, a container 74 in accordance with a third and presently preferred embodiment of the invention is disclosed and includes a bottom wall 76, a peripheral side wall 78, and a tapered shoulder portion 80 leading to a reduced diameter neck portion 82. Within the reduced diameter neck portion, there is a radially enlarged flange 84 and an uppermost portion including a threaded closure receiving portion 86 surrounding a discharge opening 88. As in the previously described embodiments, a conventional screw-type (or snap-on closure, not shown) may be utilized in conjunction with the bottle 74 in a conventional manner.

This preferred embodiment of the invention is provided with an annular groove 90 and a pair of annular steps or shoulders 92 and 94 formed in vertically spaced relationship along the peripheral side wall 78 of the container. As in the previously described embodiment, the presence of groove 90 and steps or shoulders 92 and 94 serve to enlarge the diameter of the bottle in each adjacent lower portion so that different diameter side wall portions 96, 98 and 100 are created by the groove 90 and steps or shoulders 92 and 94.

It has been discovered that the container need not have the described one or more steps formed in the peripheral sidewall. Another workable arrangement is provided by a smooth tapered peripheral sidewall extending from a smaller diameter upper portion to a larger diameter lower portion.

It has also been found that a smooth substantially cylindrical sidewall can be collapsed and folded in accordance with this invention by introducing pressurized air into the container interior to bulge the sidewall radially outwardly so as to provide a surface engageable by the folding tool, as will be described further below.

In FIG. 5, the container 74 is shown inserted within a pitcher 102. The pitcher 102, which is preferably made of relatively rigid plastic material, is formed with a bottom wall 104, a lower peripheral supporting bead 106 and a peripheral side wall 108 extending upwardly to an outwardly flared edge 110. The pitcher is also formed with an inwardly directed annular bead 112 and a pair of annular steps 114 and 116 which are located to align with and engage the corresponding groove 90 and steps or shoulders 92 and 94, respectively formed on the container. In this manner, the container 74 is retained within the pitcher 102 during pouring motions.

The pitcher 102 can be formed in a one-piece configuration, or it can be formed with a separately attached bottom wall spin welded, solvent bonded or otherwise suitably secured to the peripheral side wall. Mechanical engagements between the bottom wall and side wall such as a snap engagement are also contemplated. In the event container 74 is used alone, without the pitcher 102, the groove 90 in the container side wall may be formed as a step similar to those shown at 92, 94.

Figure 5A:
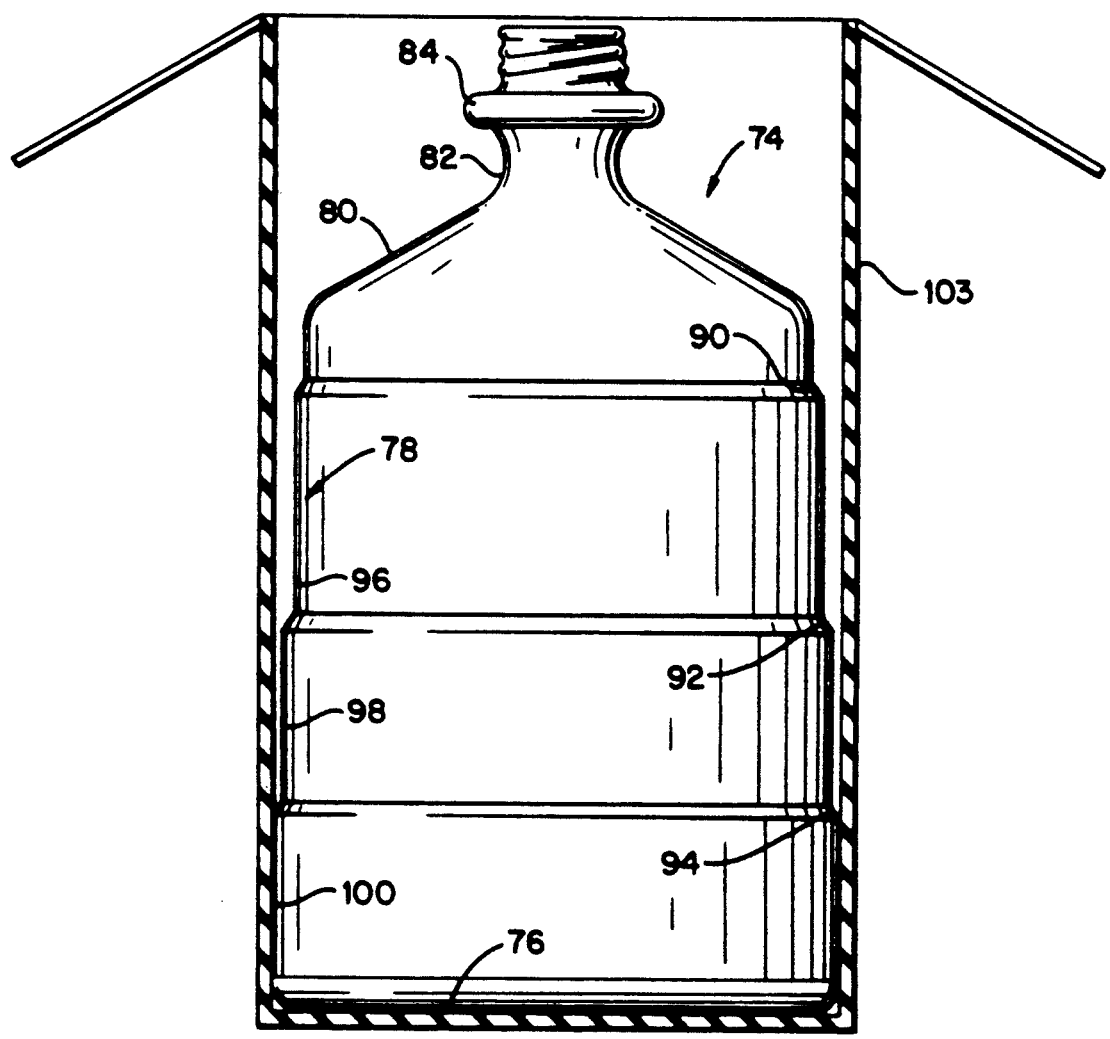
FIG. 5A is a partial cross sectional side view of the container illustrated in FIG. 5 but supported within a box.

It will be appreciated that the filled container can be used alone, with a pitcher such as that shown at 102, or with any number of other pitcher configurations. The filled container can, of course, be used in combination with a variety of outer package arrangements such as boxes, or the like. FIG. 5A illustrates the use of an essentially rectangular paperboard or cardboard box 103 as a "carrier" for the container 74.

With reference now to FIG. 6, a stack 118 of collapsed and folded containers of the type illustrated in FIG. 5 is shown in a ready-to-ship configuration. Specifically, by collapsing and folding the containers in the manner described hereinbelow, peripheral folded side wall portions 120 and 122 are arranged about a fold edge 124 to form a first concentric folded portion, and peripheral side portions 126 and 128 are arranged about a fold edge 130 to form a second adjacent folded portion. This second folded portion lies radially inwardly of the first folded portion and connects via a fold 132 to the tapered shoulder portion 80 of the container 74. Thus, a collapsed and folded peripheral side wall is provided which includes four adjacent layers or thicknesses in a zig-zag or S-shaped arrangement generally surrounding the tapered shoulder section 80 and reduced diameter neck portion 82 of the container 74. The fold edges 124, 130 lie substantially flush with the upper portion of the radial flange 84 formed in the reduced diameter neck portion 82.

In stack form, the bottom wall 76 of each container 74 is supported on the peripheral edge of the discharge opening 88 of the next adjacent container to thereby provide a compact arrangement which significantly increases shipping and/or storage efficiency.

Figure 16:
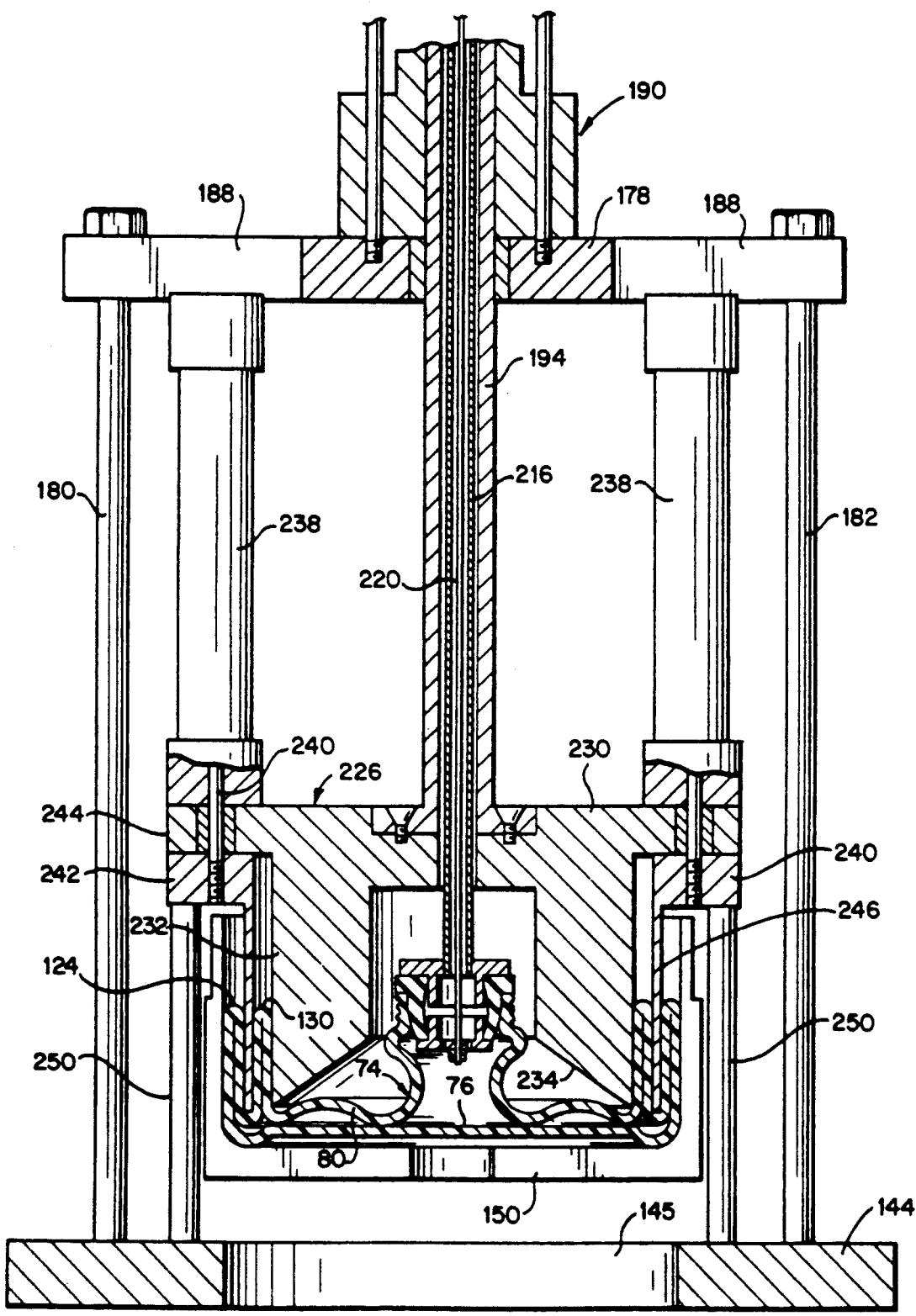
FIG. 16 is a cross sectional side view of the apparatus in FIGS. 7-15, and showing an additional collapsing of the discharge portion of the container in accordance with another and preferred embodiment of the invention.

In a modification of the above described container, the tapered shoulder section 80 may be at least partially collapsed, as shown in FIG. 16, so that the uppermost fold edges 124, 130 of the first and second folded portions are in substantial lateral alignment with the discharge opening 88 to facilitate an even more compact stacking arrangement where the bottom wall 76 of one container rests on the peripheral edge of the discharge opening 88 as well as fold edges 124, 130.

With reference now to FIGS. 7 through 16, an exemplary apparatus is illustrated for carrying out a method of collapsing and folding a bottle or container of the type illustrated in FIG. 5 to the folded and collapsed configuration shown in FIG. 6.

Specifically, referring to FIG. 7, the apparatus 140 is supported on a work table 142 or other suitable structure having a substantially flat supporting surface 144 and an aperture 145 of sufficient diameter to permit a container to pass therethrough, as explained in greater detail below.

A container holder device 146 for supporting the container during the collapsing and folding operation is mounted on the supporting surface 144, and includes a pair of opposed elements 148, 150 which are slidably mounted on guide bars 152, 154 for reciprocal movement toward and away from each other. The element 148 has a substantial semi-cylindrical configuration including a container supporting surface 156 and an upstanding peripheral wall 158. The supporting wall 156 is provided with a semi-circular cut-out portion 160. The other base supporting element 150 has a configuration substantially identical to the base element 148 so that when the two base elements engage, a substantially cylindrical supporting structure having an open end and a closed end is provided for supporting and confining the container.

Piston and cylinder assemblies 162, 164 are provided, with respective piston rods 166, 168 fixed to an associated one of the elements 148, 150 for moving the elements 148, 150 linearly along the guide rods or bars 152, 154 between open and closed positions.

The guide rods 152, 154 are suitably secured at either end within support blocks 170, 172 and 174, 176, respectively.

It will be appreciated that other container holder devices or arrangements, driven pneumatically or electrically, can be used to support the container.

Figure 7:
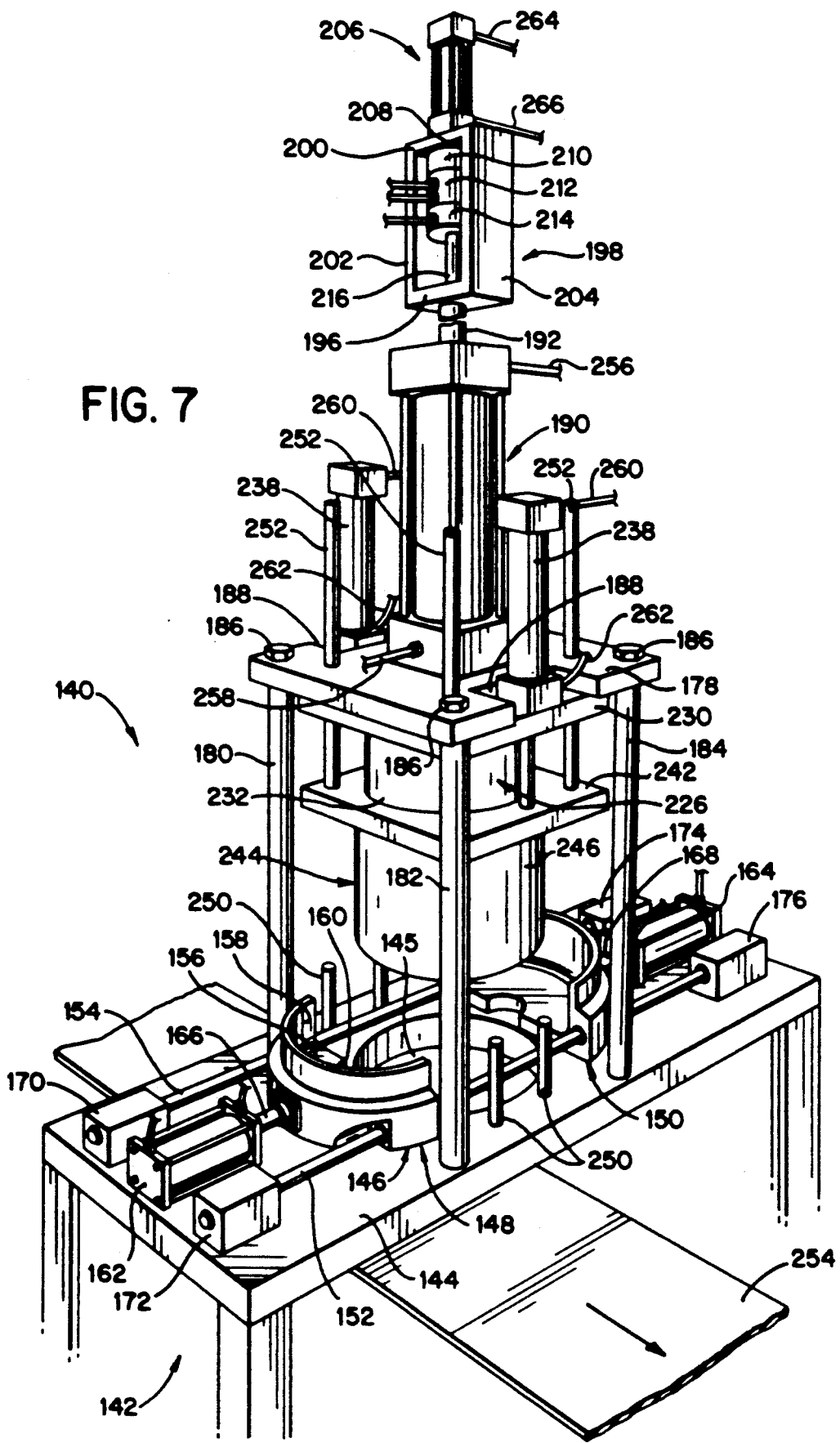
FIG. 7 is a perspective view of an apparatus for collapsing and folding containers in accordance with the invention.

Collapsing and folding tool elements are supported above the work surface 144 on a stationary platen 178 supported by a set of four tie bars, three of which are shown in FIG. 7 at 180, 128 and 184 which are rigidly secured at first ends to the table 142, and at second ends to the stationary platen 178 by bolts or other suitable fastening means 186. The stationary platen 178 is located sufficiently above the work surface 144 to permit a bottle or container of the type illustrated in FIG. 5 to be supported on the container holder 146 for folding and collapsing into the configuration shown in FIG. 6. Platen 178 is provided with a pair of cut-outs or notches 188 along opposite edges of the platen for reasons described below.

A main cylinder assembly 190 is supported on the platen 178 by any suitable means. This is a double acting cylinder assembly, with tubular piston rod portions 192, 194 (see FIG. 8) extending from the top and bottom, respectively, of the main cylinder 190. The upper tubular piston rod portion 192 is fixedly secured (by threaded engagement or other suitable means) to a lower horizontal member 196 of an open rectangular frame 198, which includes the lower horizontal member 196, an upper horizontal member 200 and a pair of side elements 202, 204.

A top cylinder assembly 206 is secured to the upper horizontal member 200 by any suitable means, and includes a piston rod 208 which extends through the member 200 and is fixed to an adaptor 210 which, in turn, is connected to a pneumatic pancake cylinder 212. The cylinder 212 is attached at its lower end to an air supply manifold 214. With reference to both FIGS. 7 and 8, it will be seen that a hollow tube 216 extends from the air supply manifold 214, through the upper and lower tubular piston rod portions 192, 194 and is fixed at its lower end to an upper bushing 218. The piston rod 220 (and/or integral or joined extension thereof) of the pancake cylinder 212 passes through the tube 216 and is fixed to a lower bushing 222. Located between the upper and lower bushings 218, 222, there is an expandable, rubber (or other resilient synthetic material) plug 224 which serves to engage and seal the discharge opening of the container as will be described further below.

Figure 8:
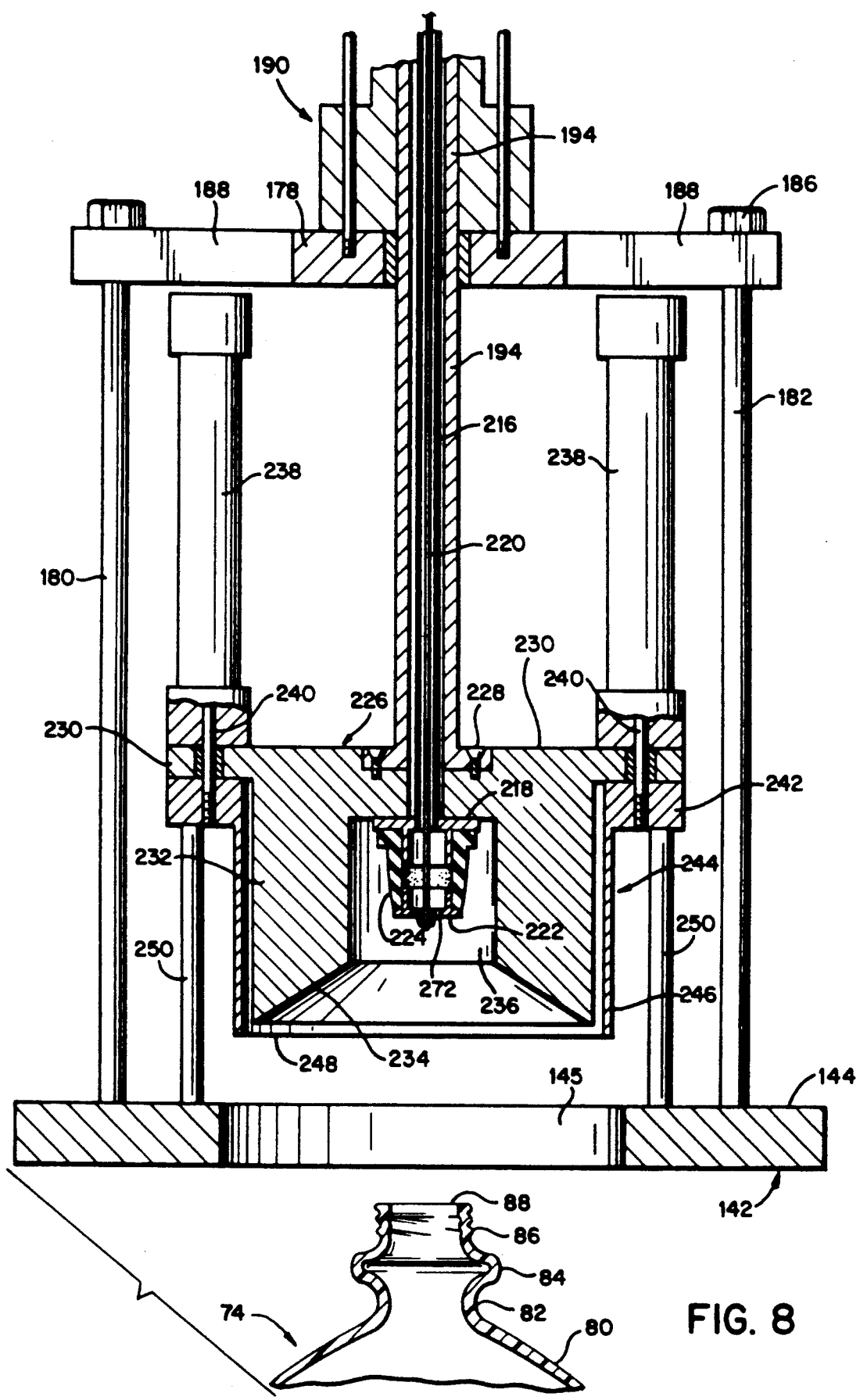
FIGS. 8-15 are partial side cross sectional views of the apparatus illustrated in FIG. 7, in various stages of operation during a collapsing and folding operation of the container of the type illustrated in FIG. 5.

As best seen in FIGS. 8 and following, the lower end of the lower tubular piston rod portion 194 of the main cylinder assembly 190 is fixed to a first inner container engaging pusher member 226 by suitable means, such as screws 228 or the like. The inner pusher member 226 includes an upper movable platen 230 and a substantially cylindrical lower portion 232 which is formed with an annular tapered surface 234 at its lowermost end which is adapted to engage the shoulder portion of the container. The lower cylindrical portion 232 is also formed with a central recess 236 which receives the expandable plug 224 when the piston rod 208 of the cylinder 206 is in its uppermost or retracted position.

A pair of identical side cylinder assemblies 238 are mounted at opposite ends of the upper movable platen 230, and have piston rods 240 which extend through the upper movable platen 230 and are fixed (by threading or other suitable means) to opposite ends of a lower movable platen 242 of a second outer container engaging pusher member 244 which is concentrically arranged relative to the inner pusher member 226.

The outer pusher member or sleeve 244 comprises the lower movable platen 242 and a depending annular skirt portion 246 having a lower annular edge 248.

A plurality (preferably four) stop pins 250 are fixed to the support surface 144, in alignment with the lower movable platen 242 to provide a stop limiting downward movement thereof. Other stop arrangements including a solid ring may be employed. The upper movable platen 230 is also aligned with the lower movable platen 242 so that the latter limits downward movement of the former as described below.

A plurality of guide bars 252 may be utilized to insure straight line reciprocatory movement of the inner and outer pusher members 226, 244, the guide bars 252 being fixed to the upper side of the lower movable platen 242 and extending through the upper movable platen 230 and the stationary platen 178, as best seen in FIG. 7.

The manner in which the above described apparatus functions to collapse and fold a bottle or container in accordance with an exemplary embodiment of the invention will now be described in detail.

With reference again to FIG. 7, a conveyor 254, or other suitable workpiece transport means, may be utilized to feed a plurality of containers 74 to the collapsing and folding apparatus 140. For example, the conveyor 254 can be arranged to feed the containers below the table 142 to a position directly beneath the aperture 145. The position of the various components including the container 74 in this initial position is shown in FIG. 8.

In a less automated system, the containers may be manually located beneath the aperture 145 on a lower work table surface (not shown).

With reference to FIG. 7, the main cylinder assembly 190, provided with inlet and outlet lines 256, 258, is shown with its tubular piston rod portions 192, 194 in their upwardmost position. Thus, the upper movable platen 230 is shown in engagement with the stationary platen 178 while the lower movable platen 242 is maintained at a predetermined spaced distance below the upper movable platen 230 by the side cylinder assemblies 238 (provided with inlet and outlet lines 260, 262) which are in their fully extended position. At the same time, the top cylinder assembly 206, provided with inlet and outlet lines 264, 266, is also in a retracted position so that the expandable plug 224 is received within the recess 236 formed in the cylindrical portion 232 of the inner pusher member 226.

With reference now to FIG. 8, prior to loading the container 74 onto the surfaces 156 of the container holder assembly 146 (omitted from FIG. 8 for clarity), the main cylinder assembly 190 is actuated to move its tubular piston rod portions 192, 194 to their downwardmost position. In doing so, the top cylinder 206 and the open rectangular frame 198 are also moved to a lowermost position. At the same time, the lower piston rod portion 194 moves the inner and outer pusher members 226, 244 downwardly until the lower movable platen 242 engages the stop pins 250. At this point, the lower piston rod portion 194 continues to move downwardly, overriding the resistance of the side cylinders 238 so that the inner pusher member 226 continues downwardly until the upper movable platen 230 engages the lower movable platen 242.

Figure 9:
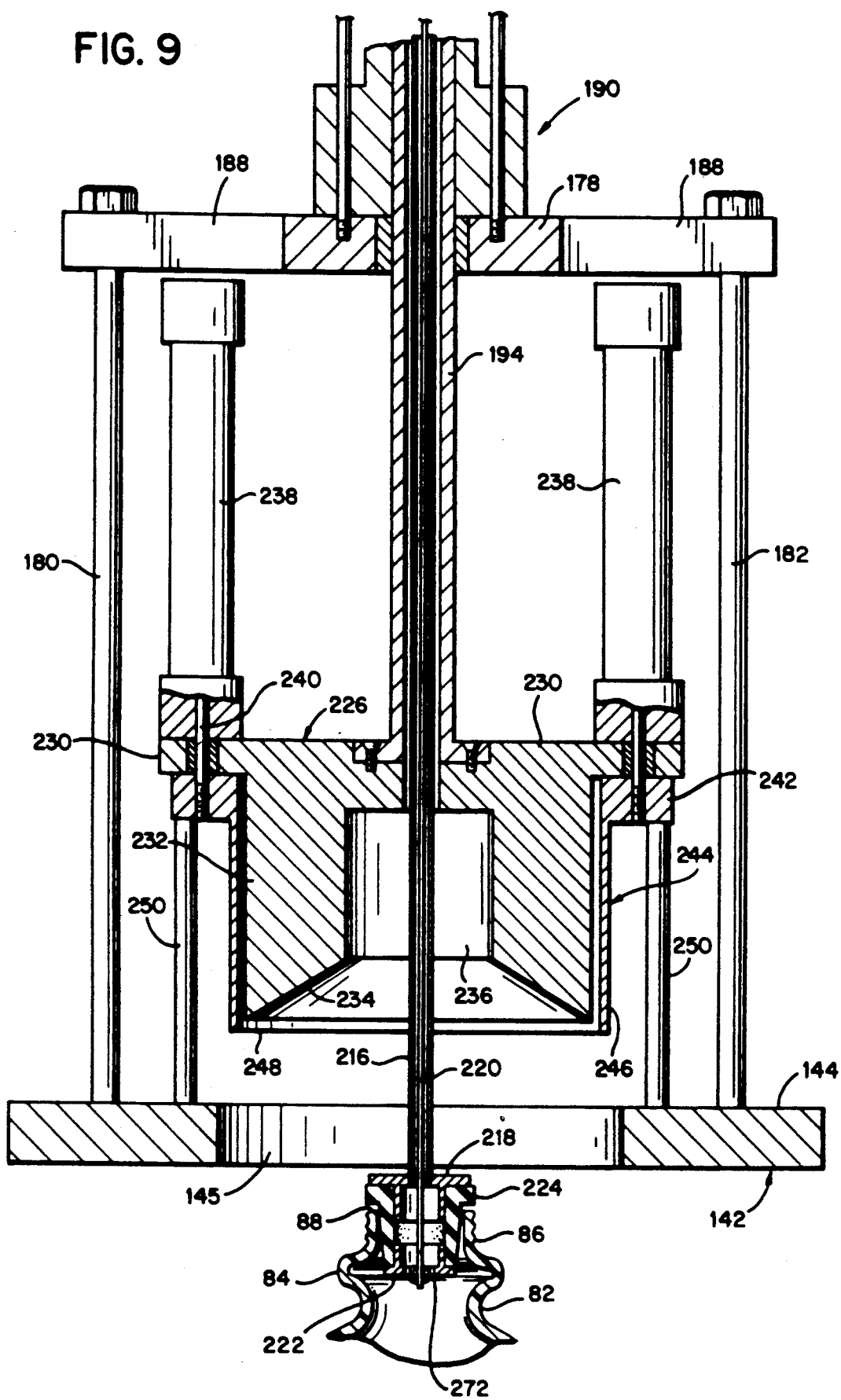

With the discharge opening of the container 74 in vertical alignment with the expandable plug 224, the top cylinder 206 is then actuated to extend the tube 216 and rod 220 downwardly until the expandable plug 224 is exposed below the work table 142 as shown in FIG. 9. The container 74 may then be manually pushed onto the plug 224, with the plug inserted within the discharge opening 88. In a fully automated system, extension of plug 224 could be timed with the arrival of the container 74 via conveyor 254, and the plug would then be inserted directly and automatically into the opening 88 via actuation of the top cylinder 206.

Figure 10:
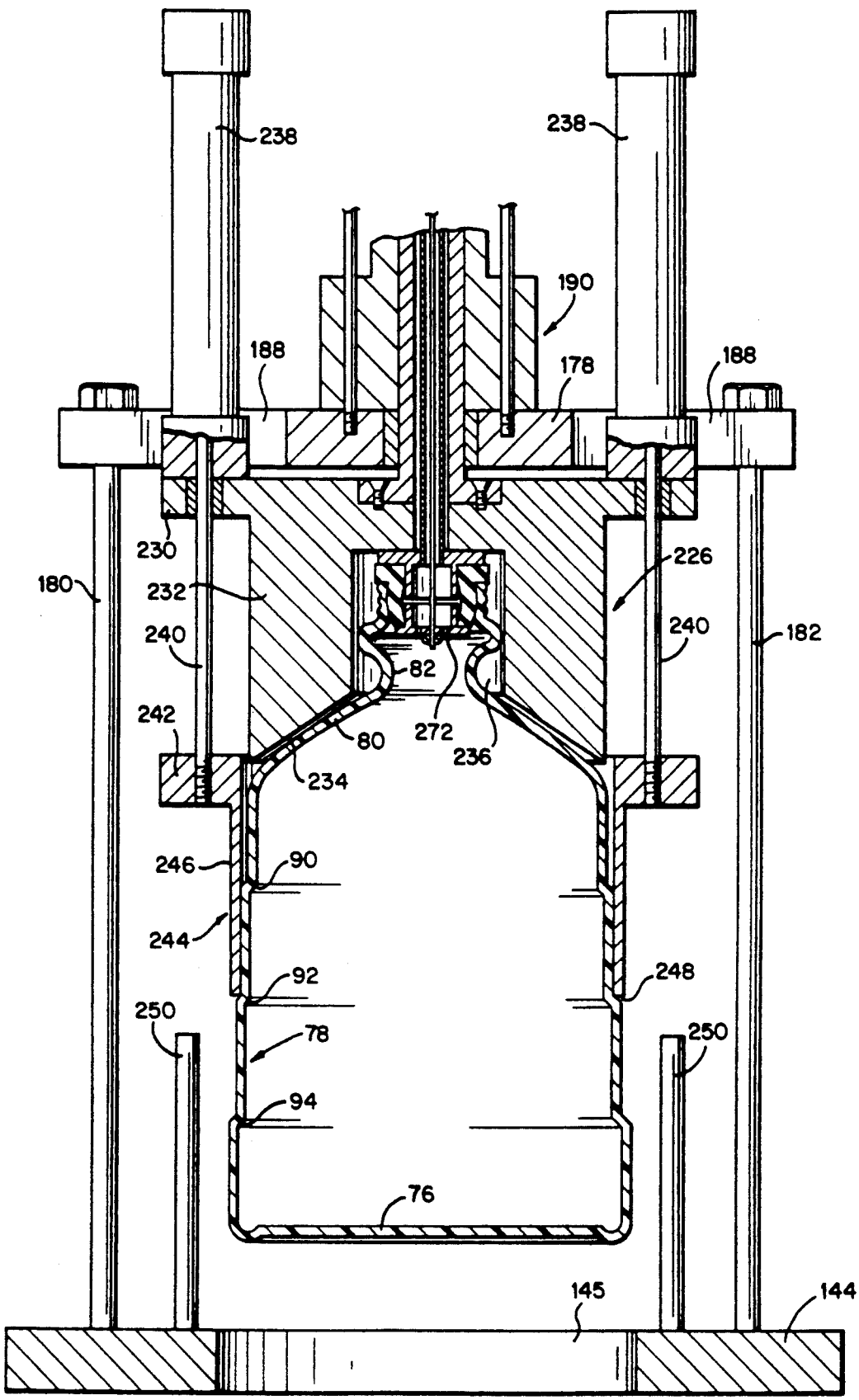

In any event, once the plug 224 is located within the discharge opening 88 (FIG. 9), the pancake cylinder assembly 212, provided with an inlet line 268 and outlet line 270, is actuated to retract the rod 220, thereby drawing the lower bushing 222 toward the upper bushing 218, causing the plug 224 to expand radially outwardly into gripping and sealing relationship with the reduced diameter neck portion 82 of the container 74 (as shown in FIG. 10).

Figure 11:
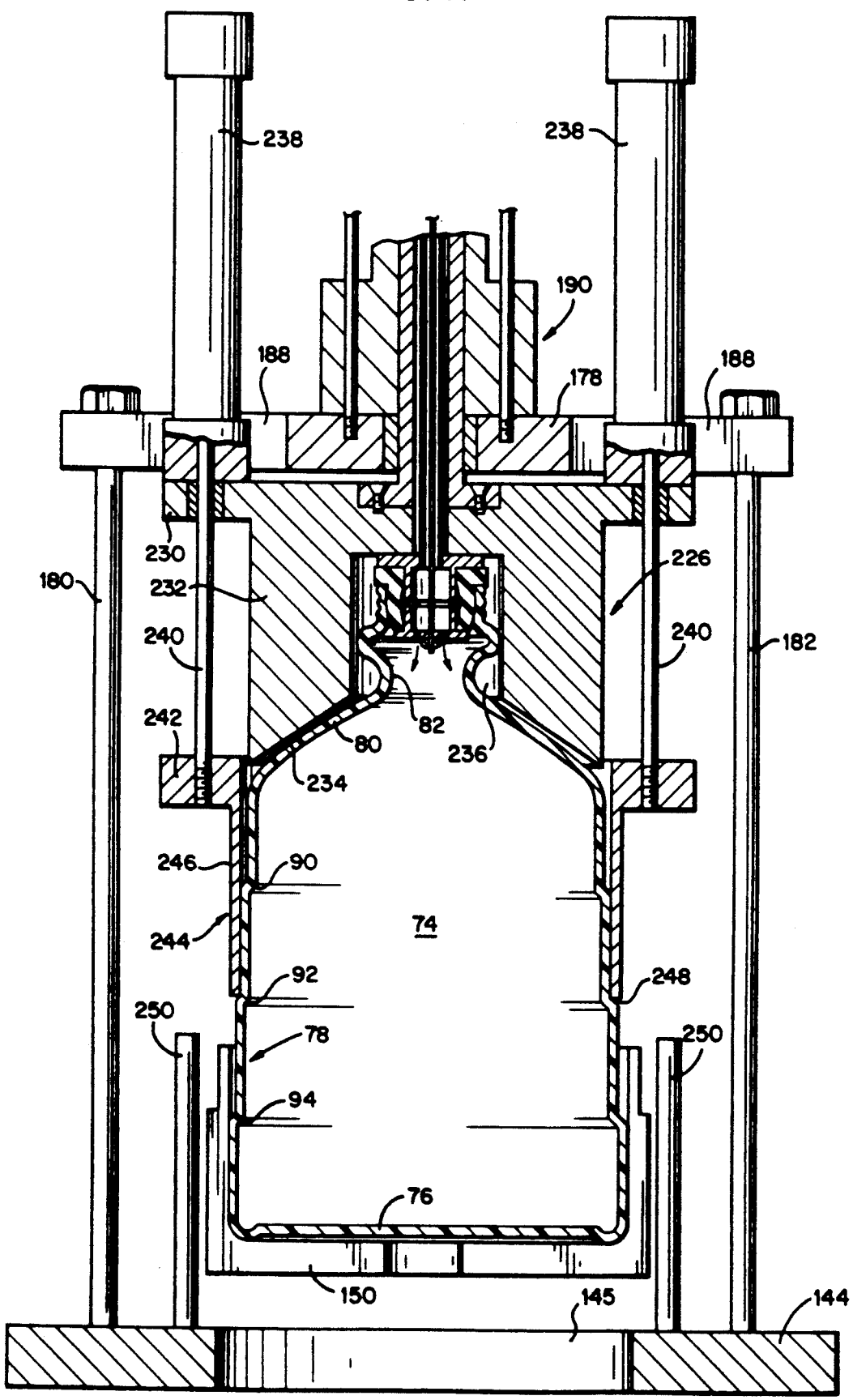

With reference now to FIGS. 10 and 11, the top cylinder assembly is reversed to draw the expandable plug 224 along with the container 74 upwardly into the aperture 145. Simultaneously, or shortly thereafter, the main cylinder assembly 190 is actuated to move its piston rod portions 192, 194 along with inner and outer pusher members 226, 244 as well as plug 224 (and the now attached container 74) upwardly into their original position as illustrated in FIG. 7.

The cylinders 162 and 164 of the container holder assembly 146 are then actuated to move the split holder sections 146, 150 into supporting engagement beneath the container 74 as partially illustrated in FIG. 11.

Air is then supplied from the manifold 214 via line 264 into the space between tube 216 and rod 220 downwardly through the center of the plug 224 and through apertures 272 provided in a lower bushing 222 into the interior of the container 74, as indicated by the arrows in FIG. 11. The air supplied to the container is preferably at very low pressure, for example 0.2 to 2 psi (preferably about 0.3 psi) and insures that there are no wrinkles, creases or dents in the container 74 which would otherwise interfere with the collapsing/folding operation.

Figure 12:
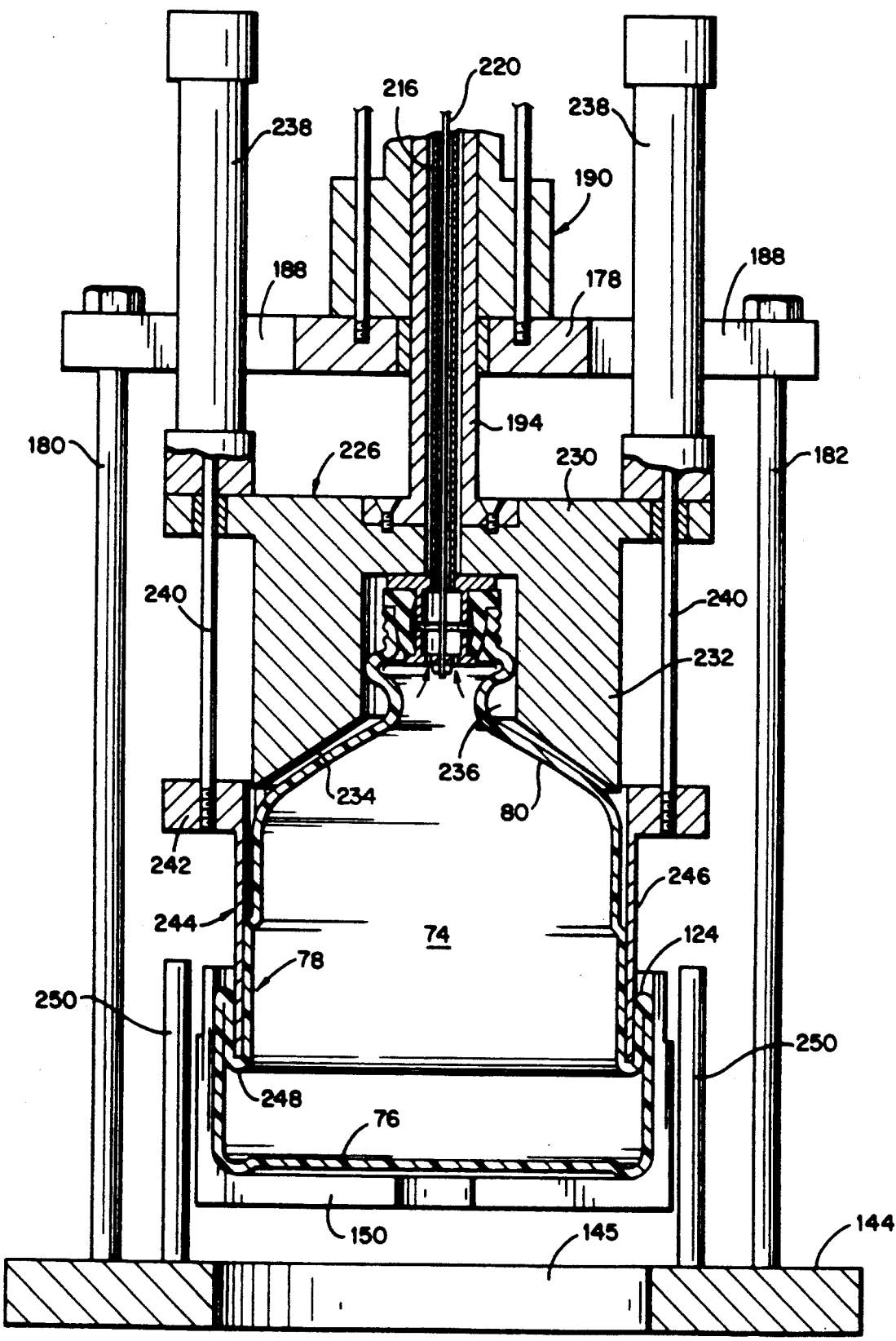
Figure 13:
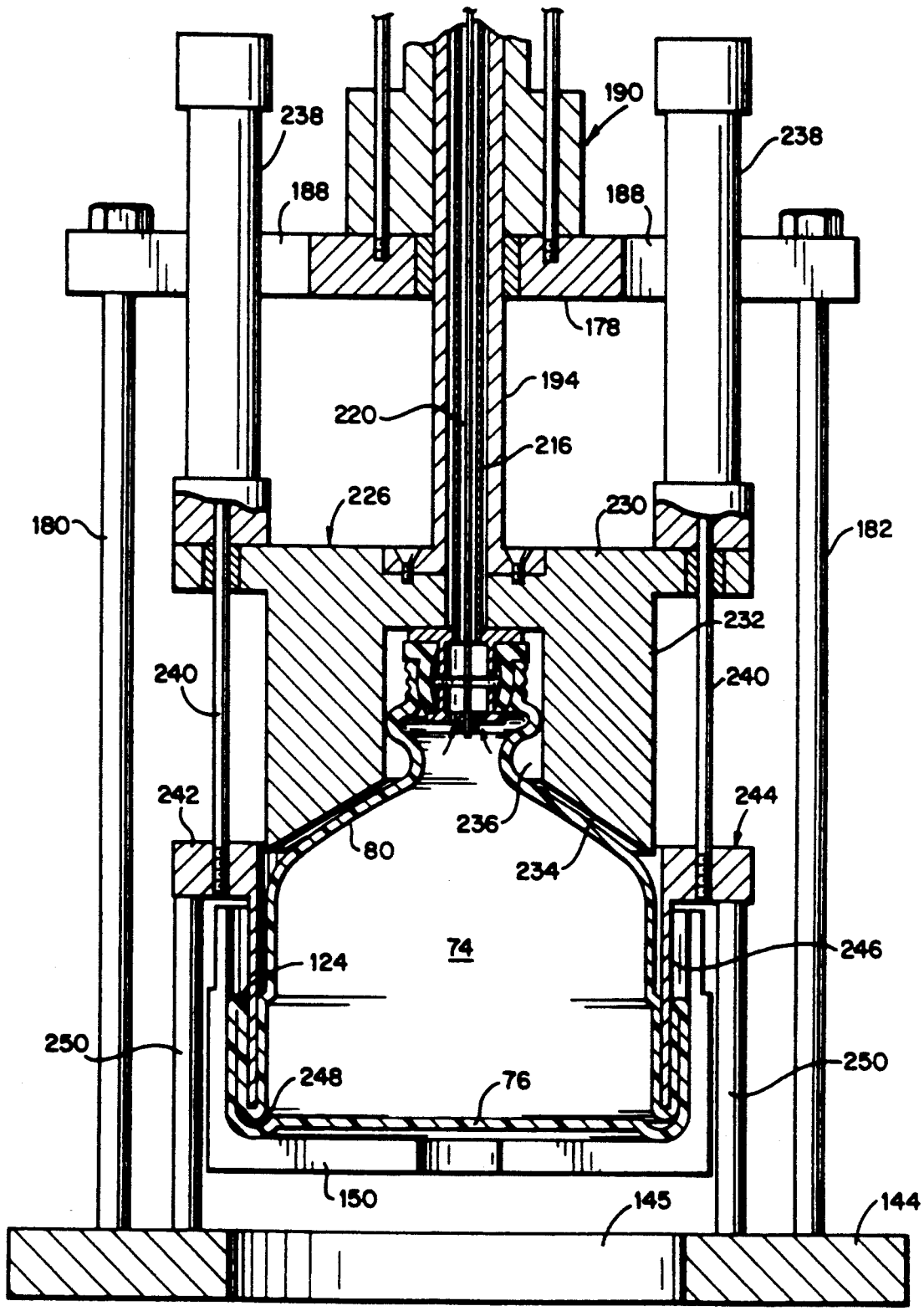

It will be appreciated that just prior to collapsing/folding, the air manifold 214 must be opened to permit the controlled escape of air during the folding and collapsing operation (as indicated by the arrows in FIGS. 12, 13, etc).

With reference again to FIG. 11, the container 74 is shown in position for the collapsing and folding operation to commence. In this regard, it is noted that the lowermost edge 248 of the outer pusher member 244 lies immediately adjacent or in engagement with the intermediate peripheral step 92 on the peripheral side wall 78 of the container 74.

Referring now to FIG. 12, actuation of the main cylinder assembly 190 causes both the inner and outer pusher members 226, 244, respectively, to move downwardly. This is because the outer pusher member is supported by reason of the side cylinder assemblies 238 on the upper movable platen 230. During this initial downward movement of the lower tubular piston rod portion 194 of the main cylinder assembly 190, the inner and outer pusher members 226, 244 are maintained a predetermined spaced distance apart by the biasing force of the piston rods 240 of the cylinder assemblies 238.

As the lower edge 248 of the outer pusher member 244 pushes downwardly on the annular step 92 of the side wall 78, the first folded portion is formed about edge 124 between the depending cylindrical skirt portion 246 and the inner cylindrical surface of the container holder assembly 146. During this collapsing and folding step, the axial length of the container 74 will shorten so that as the inner pusher member 226 follows or rides along with the outer pusher member 244, the latter does not exert any axial pressure on the tapered shoulder section 80 of the container 74. Also during this initial forming step, and as noted above, air is exhausted in a controlled manner from the interior of the container 74 through the apertures 272 and tube 216 as indicated by the arrows in FIG. 12.

Figure 14:
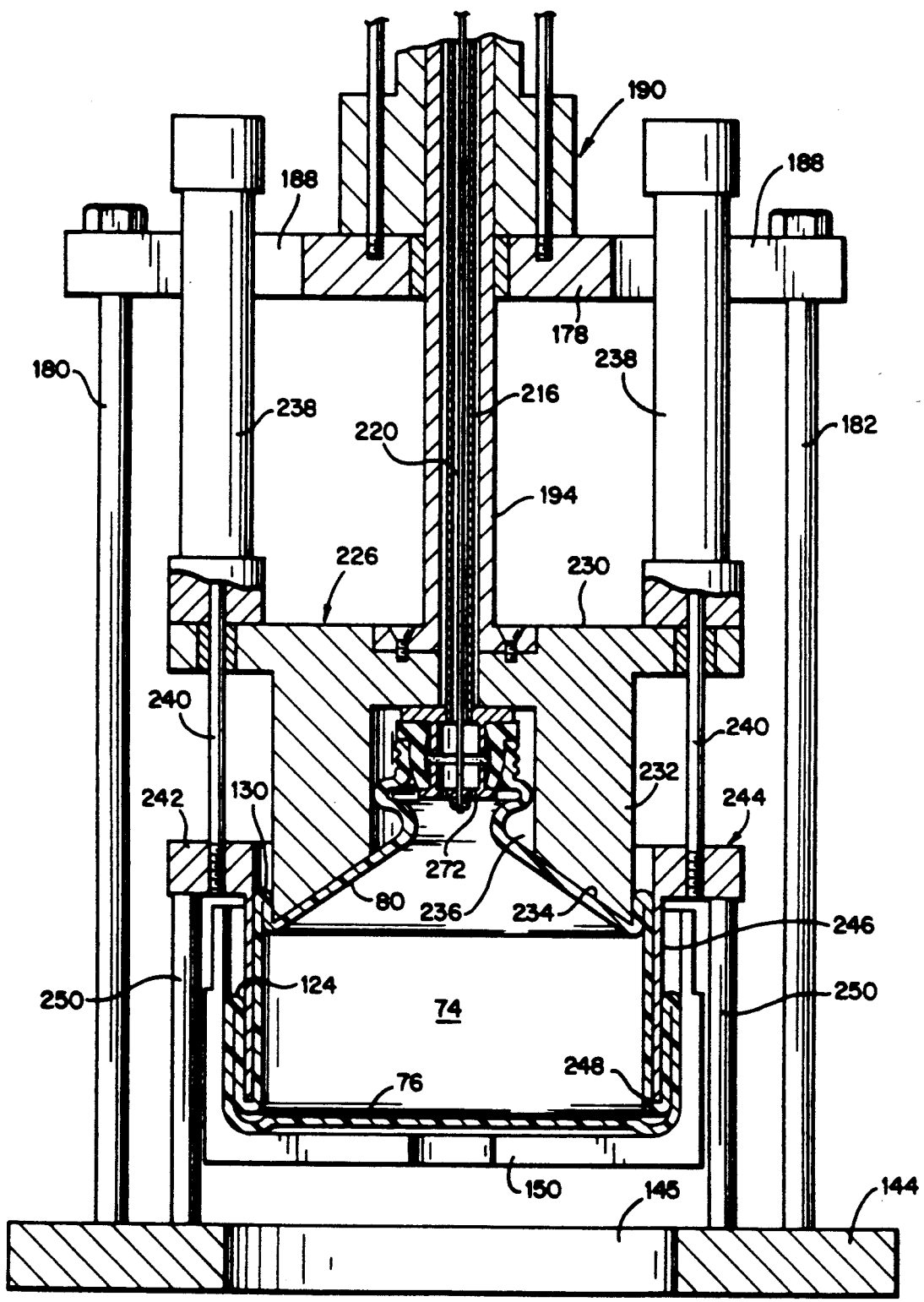
Figure 15:
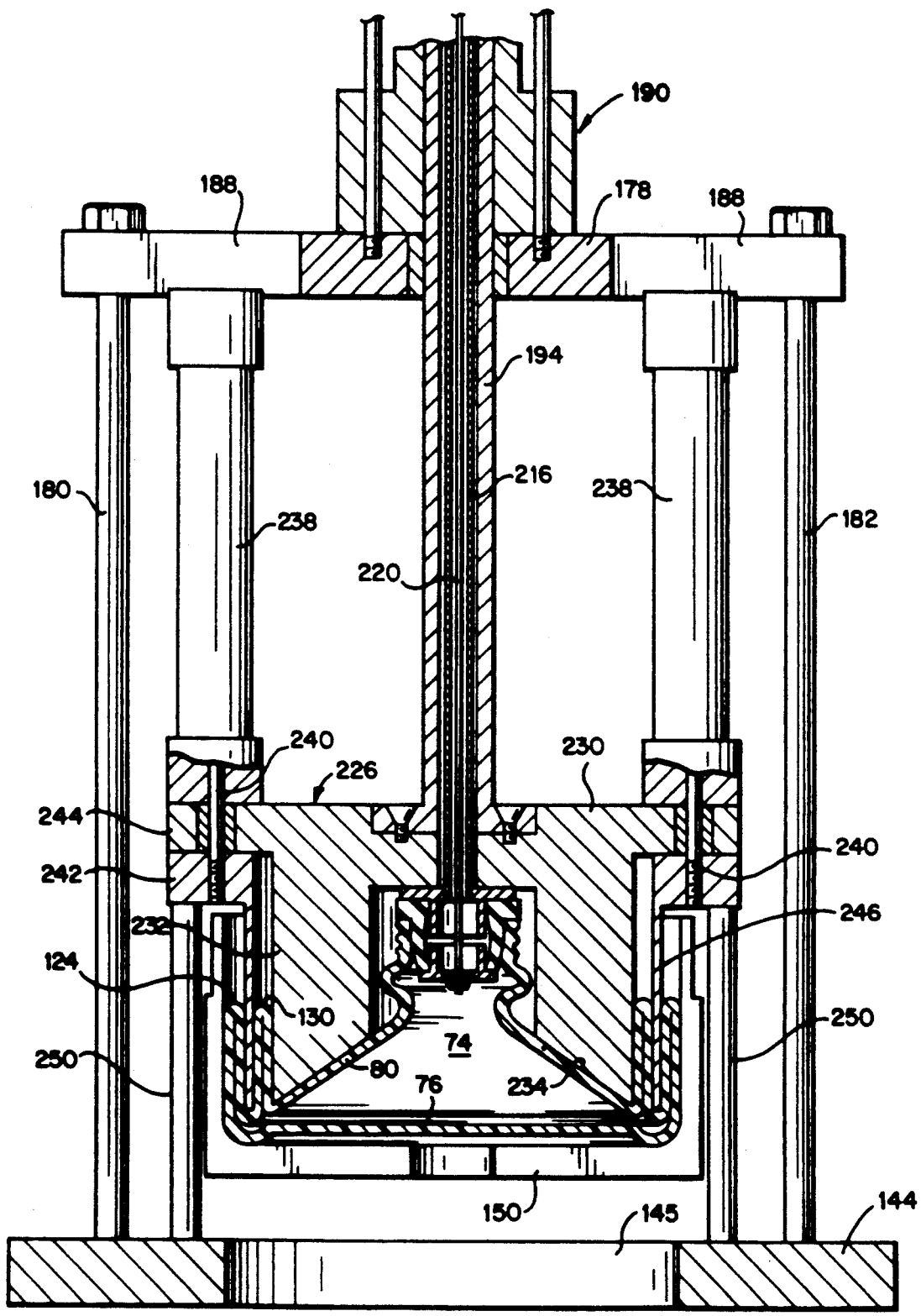

Turning now to FIG. 13, the outer pusher member 244 is shown to have reached its lowermost position, where the lower movable platen 242 has engaged the stop pins 250 and with the first folded portion completed. As the lower tubular piston rod portion 194 continues to move downwardly, the force exerted by the main cylinder assembly 190 overcomes the opposing resistive forces of the cylinder assemblies 238 so that the inner pusher member 226 continues downward movement relative to the now stationary outer pusher member 244. With reference to FIGS. 14 and 15, during this continued downward movement of the inner pusher member 226, the tapered surface 234 engages the tapered shoulder portion of the container and pushes the container downwardly to effect a second folded portion about a fold edge 130, between the outer peripheral surface of the cylindrical portion 232 of the inner pusher member 226 and the inner peripheral surface of the depending skirt portion 246 of the outer pusher member 244. The upper and lower shoulders or steps 90 (groove 90 is shown as a step here), 94, respectively, formed in the container side wall 78, serve to facilitate the collapsing and folding action during this second forming step.

When the upper movable platen 230 of the inner pusher member 226 has bottomed out against the lower movable platen 242 of the outer pusher member 244, as best seen in FIG. 15, the second folded portion of the peripheral side wall 78 is completed. This second folded portion lies concentrically adjacent and radially inwardly of the first folded portion with the uppermost fold edges 124, 130 at substantially the same height.

At this stage of the operation, the container holder device 146 may be opened or retracted, and the top cylinder 206 actuated to extend the tube 216 and rod 220 downward to push the collapsed and folded container away from the inner and outer pusher members 226, 244. Thereafter, the pancake cylinder assembly 212 may be actuated to extend the rod 220 to thereby contract the expandable plug 224 so that the collapsed and folded container may be removed from the apparatus.

It may advantageous, however, to effect an additional collapsing step as illustrated in FIG. 16. Thus, after the lower piston rod portion 194 of the main cylinder assembly 190 has reached its lowermost position with both inner and outer pusher members 226, 244 as shown in FIG. 16, the top cylinder 206 may be actuated to partially extend the tube 216 and rod 220 so that the expandable plug 224 is driven downwardly to at least partially collapse the tapered shoulder section 80 of the container 74 to thereby position the discharge opening 88 of the container 74 at approximately the same height as the uppermost edges 124, 130 of the first and second folded portions. This arrangement permits an even more compact and efficient stacking arrangement for shipment and/or storage purposes. Removal of the container would then be achieved as described above.

It is also within the scope of this invention to modify the interior surface 234 of the inner pusher member 226 so that the tapered shoulder section 80 of the container 74 is at least partially collapsed during the formation of the second folded portion by the inner pusher member 226. This type of arrangement would avoid the necessity of having to extend the plug 224 downwardly via top cylinder 206 in a separate step as described above.

Other modifications in accordance with the invention relate to the shape of the container side wall. For example, the apparatus as described above may be utilized to form a collapsed and folded container as illustrated in FIGS. 6, 14 or 16 from a container having a smooth tapered surface or from a container having a smooth cylindrical surface. In the former case, the natural taper of the side wall provides the frictional engagement with the lower edge 248 of the outer pusher member 244 required to initiate the folding action. In the latter case, the introduction of air under pressure prior to commencing the collapsing/folding operation, can be used to bulge the side wall of the container outwardly, again providing the frictional engagement necessary to initiate folding.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for collapsing and folding an upright container to a compact stackable configuration, the container having a bottom wall, peripheral side wall with at least upper, lower and intermediate annular stepped portions in the peripheral side wall, and a top wall having a discharge opening therein, the apparatus comprising:

means for supporting and holding the container in an upright position; first forming means for engaging and exerting a downward force on the intermediate annular stepped portion of the peripheral side wall and for effecting the formation of a first folded portion in the peripheral side wall; and second forming means for engaging and exerting a downward force on the top wall for effecting the formation of a second folded portion in the peripheral side wall substantially concentric with and radially adjacent the first folded portion.

2. Apparatus according to claim 1 and further including first stop means on said supporting means for limiting the downward movement of the first forming means.

3. Apparatus according to claim 2 and further including second stop means on said first forming means for limiting downward movement of the second forming means.

4. Apparatus according to claim 1 and including means for engaging the discharge opening in sealing relationship.

5. Apparatus according to claim 1 and further including means for charging the container with a gas under pressure and for subsequently venting said gas.

6. Apparatus according to claim 1 wherein said first forming means comprises an outer pusher member having a first platen and a substantially cylindrical skirt portion depending therefrom.

7. Apparatus according to claim 6 wherein said second forming means comprises an inner pusher member having a second platen and a substantially cylindrical lower portion, arranged for sliding movement within said outer pusher member.

8. Apparatus according to claim 7 and including a pair of cylinder assemblies for resiliently biasing said inner and outer pusher members away from each other.

9. Apparatus according to claim 8 and including a main cylinder assembly having a piston attached at one end to said inner pusher member and having means for overriding said pair of cylinder assemblies.

10. Apparatus according to claim 1 and including expandable plug means for insertion and expansion within the discharge opening of the container.

11. Apparatus according to claim 10 and including means for effecting expansion of said plug means.

* * * * *